(12) United States Patent
Biran et al.

(10) Patent No.: US 10,606,941 B2
(45) Date of Patent: Mar. 31, 2020

(54) ANNOTATING DOCUMENTS ON A MOBILE DEVICE

(71) Applicant: Hightail, Inc., Campbell, CA (US)

(72) Inventors: Daniel Biran, San Jose, CA (US); Matthew Riley Dean, San Francisco, CA (US); David Gee Louie, Mountain View, CA (US); Justin Fiedler, La Jolla, CA (US)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 0 days.

(21) Appl. No.: 15/084,000

(22) Filed: Mar. 29, 2016

(65) Prior Publication Data

US 2017/0046321 A1    Feb. 16, 2017

Related U.S. Application Data

(60) Provisional application No. 62/203,359, filed on Aug. 10, 2015.

(51) Int. Cl.
| | |
|---|---|
| *G06F 3/048* | (2013.01) |
| *G06F 17/24* | (2006.01) |
| *G06F 3/0485* | (2013.01) |
| *G06F 3/0488* | (2013.01) |

(52) U.S. Cl.
CPC .......... *G06F 17/241* (2013.01); *G06F 3/0485* (2013.01); *G06F 3/0488* (2013.01)

(58) Field of Classification Search
CPC ..... G06F 17/241; G06F 3/0485; G06F 3/0488
See application file for complete search history.

(56) References Cited

U.S. PATENT DOCUMENTS

| | | | | |
|---|---|---|---|---|
| 7,962,846 | B2 * | 6/2011 | Lerner | G06F 17/241 715/230 |
| 8,566,353 | B2 * | 10/2013 | Fink | H04N 7/17318 707/782 |
| 8,706,685 | B1 | 4/2014 | Smith et al. | |
| 8,732,181 | B2 | 5/2014 | Massand | |
| 8,769,491 | B1 | 7/2014 | Conti et al. | |

(Continued)

OTHER PUBLICATIONS

Animsition: Animated Page Transitions with jQuery | Noupe, May 17, 2015, pp. 1-8 http://www.noupe.com/development/animsition-user-friendly-jquery-plugin-for-animated-page-transitions-88632.html.*

(Continued)

*Primary Examiner* — Scott T Baderman
*Assistant Examiner* — Mario M Velez-Lopez
(74) *Attorney, Agent, or Firm* — Sprinke IP Law Group

(57) ABSTRACT

A computing device displays electronic content associated with a plurality of annotations each corresponding to a respective portion of the electronic content. A first annotation, which includes one or more comments associated with a first portion of the electronic content, is displayed. While the first annotation is displayed, an input to display a second annotation is received. The second annotation is associated with a second portion of the electronic content, and includes one or more comments associated with the second portion. Responsive to receiving the input, the second portion of the electronic content and the one or more comments associated with the second portion are displayed.

23 Claims, 11 Drawing Sheets

(56) References Cited

U.S. PATENT DOCUMENTS

| | | | | |
|---|---|---|---|---|
| 8,879,870 | B2* | 11/2014 | Vitsnudel | G06T 5/50 382/276 |
| 8,984,405 | B1* | 3/2015 | Geller | G11B 27/34 715/719 |
| 9,275,684 | B2 | 3/2016 | Amento et al. | |
| 9,424,281 | B2* | 8/2016 | Smith | G06F 16/972 |
| 9,953,216 | B2* | 4/2018 | Alvarez | G06K 9/00355 |
| 2001/0051909 | A1* | 12/2001 | Keith | G06Q 30/0601 705/37 |
| 2007/0245243 | A1* | 10/2007 | Lanza | G06F 17/30817 715/723 |
| 2007/0268315 | A1* | 11/2007 | Hoshino | G06F 3/0481 345/642 |
| 2007/0291297 | A1* | 12/2007 | Harmon | G06F 17/212 358/1.15 |
| 2008/0168073 | A1* | 7/2008 | Siegel | G06F 17/3002 |
| 2009/0063492 | A1* | 3/2009 | Meyyappan | G06F 3/03545 |
| 2010/0231721 | A1* | 9/2010 | Meloche | G08G 5/065 348/159 |
| 2010/0287473 | A1* | 11/2010 | Recesso | G09B 5/00 715/716 |
| 2010/0313128 | A1* | 12/2010 | Phillips | G05B 19/05 715/715 |
| 2012/0210274 | A1* | 8/2012 | Pettigrew | G09G 5/02 715/810 |
| 2013/0097481 | A1* | 4/2013 | Kotler | G06F 17/241 715/230 |
| 2013/0145269 | A1* | 6/2013 | Latulipe | G06F 3/048 715/720 |
| 2013/0167075 | A1* | 6/2013 | Chanda | G06F 3/0481 715/800 |
| 2013/0191720 | A1* | 7/2013 | Simons | G06F 17/2247 715/234 |
| 2013/0326340 | A1* | 12/2013 | Woo | G06F 3/0484 715/243 |
| 2014/0187315 | A1* | 7/2014 | Perry | A63F 13/10 463/29 |
| 2014/0276057 | A1* | 9/2014 | Lee | A61B 8/469 600/441 |
| 2015/0035959 | A1* | 2/2015 | Amble | A61B 5/117 348/74 |
| 2015/0046828 | A1* | 2/2015 | Desai | G06F 1/163 715/739 |
| 2015/0261752 | A1* | 9/2015 | Li | G06F 17/30038 707/738 |
| 2016/0170591 | A1* | 6/2016 | Heo | G06F 3/0483 715/777 |
| 2017/0052939 | A1* | 2/2017 | Seol | G06F 3/04883 |

OTHER PUBLICATIONS

Comment on a Track on SoundCloud by grovo.com, published Jul 22, 2013, pp. 1 https://www.youtube.com/watch?v=K9ATeZLkcg8,.*

* cited by examiner

ANNOTATING DOCUMENTS ON A MOBILE DEVICE

CROSS-REFERENCE TO RELATED APPLICATION

This application claims the benefit of U.S. Provisional Patent Application No. 62/203,359, filed Aug. 10, 2015, which is incorporated herein by reference in its entirety.

BACKGROUND

This disclosure relates generally to annotating electronic content, and in particular to integrating content viewing and annotation within a single user interface.

Document collaboration tools are becoming a popular resource for users collaborating on production or editing of electronic content. When collaborating on a document, users often communicate their suggestions or opinions for the document to other users by directly annotating the document or by providing comments via a separate communication channel, such as email. Generally, document collaboration tools enable users to create static annotations of documents. That is, a user can add text, images, or other annotations into the document file that can be distributed to other users, but the other users cannot respond to the annotation without modifying the annotation or adding another annotation to the document. Accordingly, users of the document collaboration tools may use a separate communication channel to discuss the document. The users therefore often switch between applications to view the document and comment on the document, which is inconvenient to the users. In particular, such application switching is challenging on a mobile device with limited display area, which often lack space to simultaneously display both a document and a communication application.

SUMMARY

A computing device provides a convenient and easy-to-use interface for creating, modifying, and viewing annotations associated with electronic content. The annotation methods provided by the computing device allow users to manage annotations associated with any of a variety of types of electronic content, such as images, multipage documents, or videos.

The computing device displays the electronic content, which is associated with a plurality of annotations each corresponding to a portion of the content (such as a spatial region, a spatial region at a specified time, or a spatial region on a specified page). The computing device also displays a first annotation, which includes one or more comments received from users and which is associated with a first portion of the electronic content. While displaying the first annotation, an input to display a second annotation is received. The second annotation is associated with a second portion of the electronic content, and includes one or more comments associated with the second portion. In response to receiving the input, the computing device displays the second portion of the electronic content and the one or more comments associated with the second portion.

The features and advantages described in this summary and the following detailed description are not all-inclusive. Many additional features and advantages will be apparent to one of ordinary skill in the art in view of the drawings, specification, and claims.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
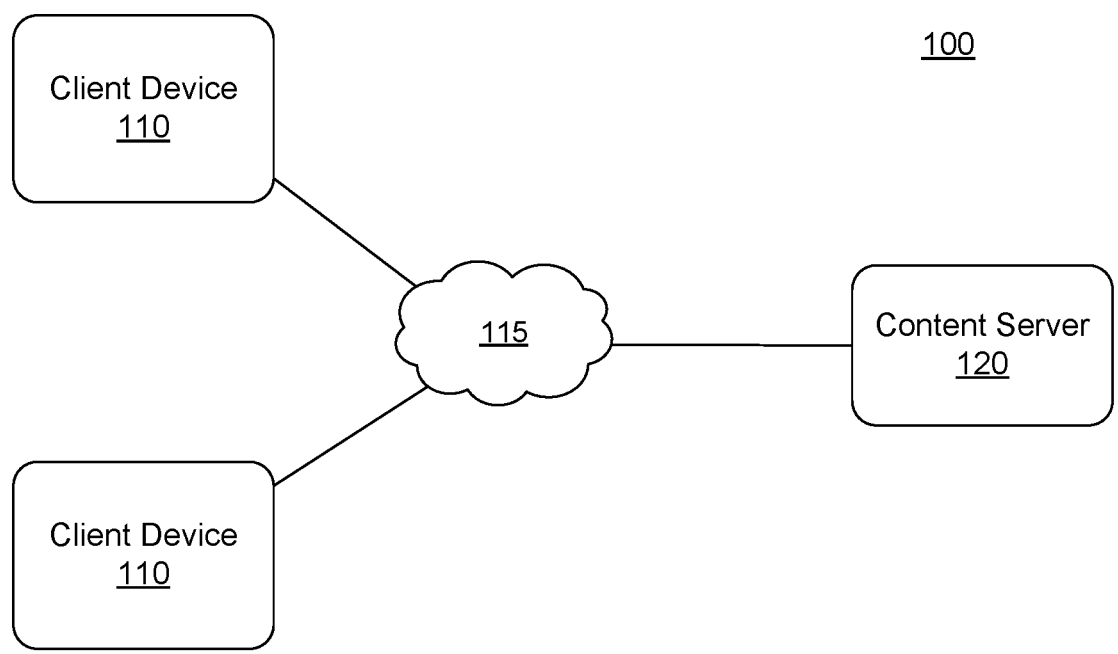
FIG. 1 illustrates an example system environment for annotating electronic content, according to one embodiment.

FIG. 1 illustrates an example system environment 100 for annotating documents, according to one embodiment. In one embodiment, the environment 100 includes one or more client devices 110 and a content server 120 communicating with the client devices 110 over a network 115.

The client device 110 displays electronic content and annotations associated with the content to a user. The client device 110 may display and facilitate user annotations of any of a variety of types of electronic content, including documents such as images, slide decks, or PDFs, as well as video or audio files. The client device 110 may be any user computing device, such as a desktop computer, a laptop computer, a tablet, or a mobile phone. The client device 110 includes one or more input devices for receiving inputs from a user, such as a touchscreen display or a mouse and keyboard. In one embodiment, the client device 110 executes an application allowing a user of the client device 110 to interact with electronic content. For example, the client device 110 executes a browser application or a native application that interacts with the content server 120 to display content stored at the content server 120 to a user of the client device 110.

The client device 110 enables users to annotate the content and view annotations associated with the content. As described below with respect to FIGS. 2A-6F, the client device 110 integrates annotation functionality into a content viewer. By providing content viewing and annotation within a single interface, the client device 110 enables users to easily annotate electronic content without, for example, switching between applications on the client device 110. As used herein, an "annotation" is a set of one or more comments from users of the client devices 110 that is associated with a specified portion of content. Each comment includes a user response to the specified portion of content, and may include text, images, links, or the like. When creating an annotation, a user of the client device 110 specifies the portion of the content with which to associate the annotation. The specified portion may be a spatial area of the content (e.g., a portion of an image), a temporal segment of the content (e.g., a segment of an audio file), a page of the content, both a spatial and temporal portion of the content (e.g., an area within one or more frames of a video), and/or another portion of the content. User comments added to the content are linked to the specified portion. In one embodiment, users can reply to an annotation in the electronic content, creating a comment chain associated with the specified portion of the content and configured for display along with the electronic content.

The client device 110 communicates annotations created by users to the content server 120, which may display the content and annotations to users of other client devices 110. Thus, for example, the client device 110 enables a user to comment on a specified portion of a document and share the comment with other users via the content server 120. The client devices 110 used by the other users display the comment to the other users and indicate the portion of the document with which the comment is associated.

In one embodiment, the types of actions a user may take on a client device 110 depend on the configuration of the client device 110. For example, a mobile device may allow a user to view content and annotations, create new annotations, and add comments to the annotations, but may not allow the user to modify the portion of the content with which an annotation is associated. A larger computing device (e.g., a desktop or laptop computer) may allow the user to also modify the annotation.

The content server 120 facilitates sharing of electronic content and associated annotations between the client devices 110. The content server 120 may be any content storage device or system, such as a file hosting service, a document management system, or an email server. Users of the client devices 110 may share electronic content and associated annotations using the content server 120. In one embodiment, the content server 120 stores the electronic content and any annotations associated with the content, and users access the content by directly accessing the content server 120. For example, a user may share a document with another user by uploading the document to the content server 120 and sending the other user a link to the document's location at the server 120. Any users who have the link to the document may access the document via the content server 120 to view the content of the document and any associated annotations, as well as to create or modify annotations associated with the content. In another embodiment, electronic content and its associated annotations are stored at client devices 110, and the content server 120 synchronizes the content by pushing changes made to a content item at a first client device 110 (such as the creation of a new annotation) to one or more other client devices 110 storing the content item. In yet another embodiment, the content server 120 stores annotations associated with electronic content stored at client devices 110, and synchronizes the annotations with the electronic content at the devices 110.

The content server 120 may encrypt the content or otherwise control access to the content by unauthorized users. For example, the content server 120 may require a user to provide login credentials to access a particular document or set of documents the user has been authorized to access. In one embodiment, users may be provided with different levels of access. For example, some users may be given both read and write access to a content item, permitting the user to view the content item and any associated annotations, edit the content item, and annotate the content item. Other users may be given annotation-only permissions for a content item, allowing the user to add annotations or comments to the content item but not allowing the user to modify the content item itself.

The client devices 110 and content server 120 are configured to communicate via the network 115, which may comprise any combination of local area and/or wide area networks, using both wired and/or wireless communication systems. In one embodiment, the network 115 uses standard communications technologies and/or protocols. For example, the network 115 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 115 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 115 may be represented using any suitable format, such as hypertext markup language (HTML) or extensible markup language (XML). In some embodiments, all or some of the communication links of the network 115 may be encrypted using any suitable technique or techniques.

Figure 2B:
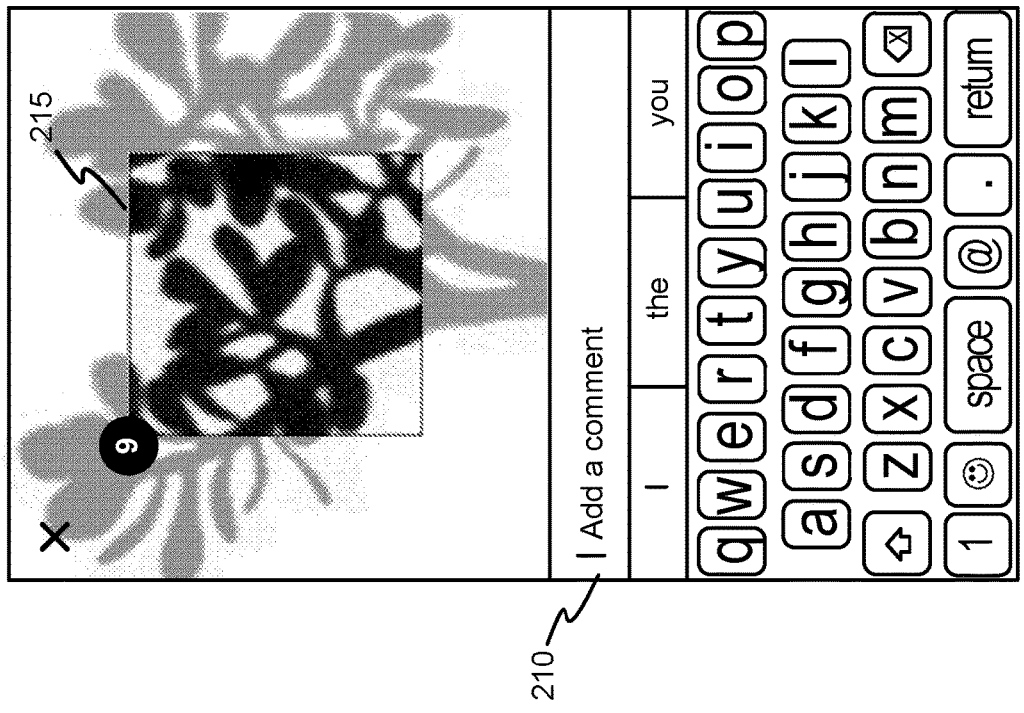
FIGS. 2A-2D illustrate a process performed at the client device for creating an annotation associated with electronic content, according to one embodiment.
Figure 2A:
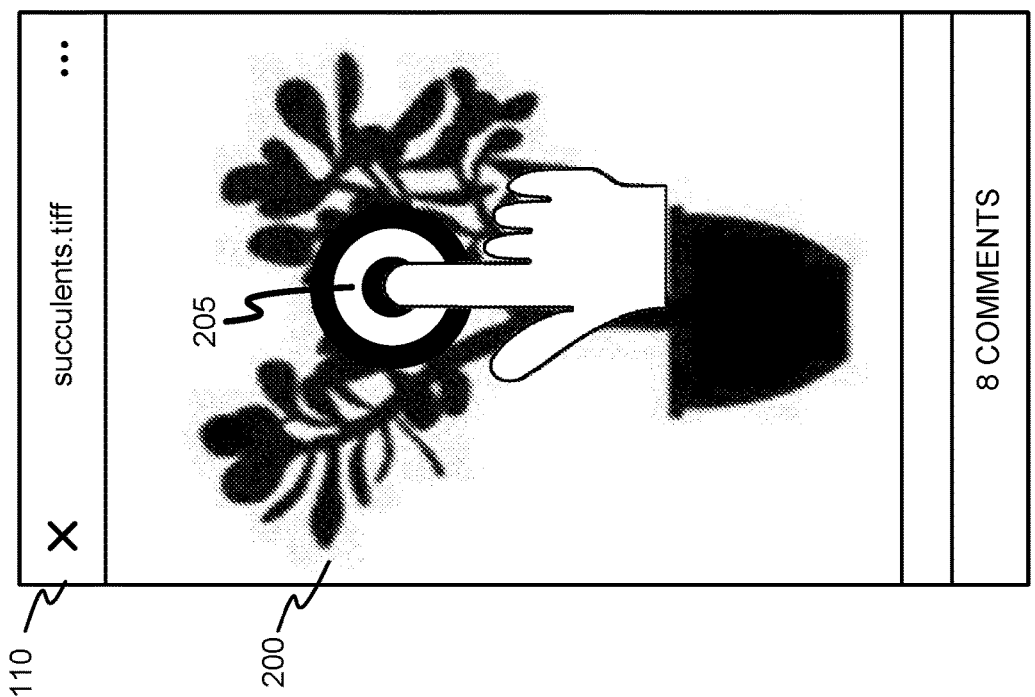

FIGS. 2A-2D illustrate a process performed at the client device 110 for creating an annotation associated with electronic content, according to one embodiment. In the example of FIGS. 2A-2D, the process is described with respect to an image 200 as an example type of electronic content. However, other content types may be annotated by processes similar to those described herein. As shown in FIG. 2A, the client device 110 displays the image 200. While the image 200 is displayed, a user input 205 is received to create an annotation associated with the image. For example, FIG. 2A illustrates a touch input (e.g., a press-and-hold input) received at a touchscreen display of the client device 110 as the input 205 to create an annotation, although the input may alternatively be received by other input devices of the client device 110 (such as a mouse).

In one embodiment, the user input 205 indicates a region of the image 200 with which to associate the annotation. In response to the input 205, the client device 110 displays a text entry box 210 and a selection box 215, as shown in FIG. 2B. The user can enter text, such as commentary on the image 200, into the text entry box 210 as a comment associated with the annotation. The selection box 215 defines a region of the image 200 with which the user desires to associate the annotation. In one embodiment, the user can change the dimensions of the selection box 215, increase or decrease a zoom level of the image 200, and/or move the position of the selection box 215 or the image 200 on the display of the client device 110 to change the region of the image 200 that will be associated with the annotation. Although FIG. 2B illustrates the selection box 215 having a rectangular shape, the selection box 215 may be any of a variety of other shapes such as a circle, a triangle, or a freeform polygon.

Figure 2D:
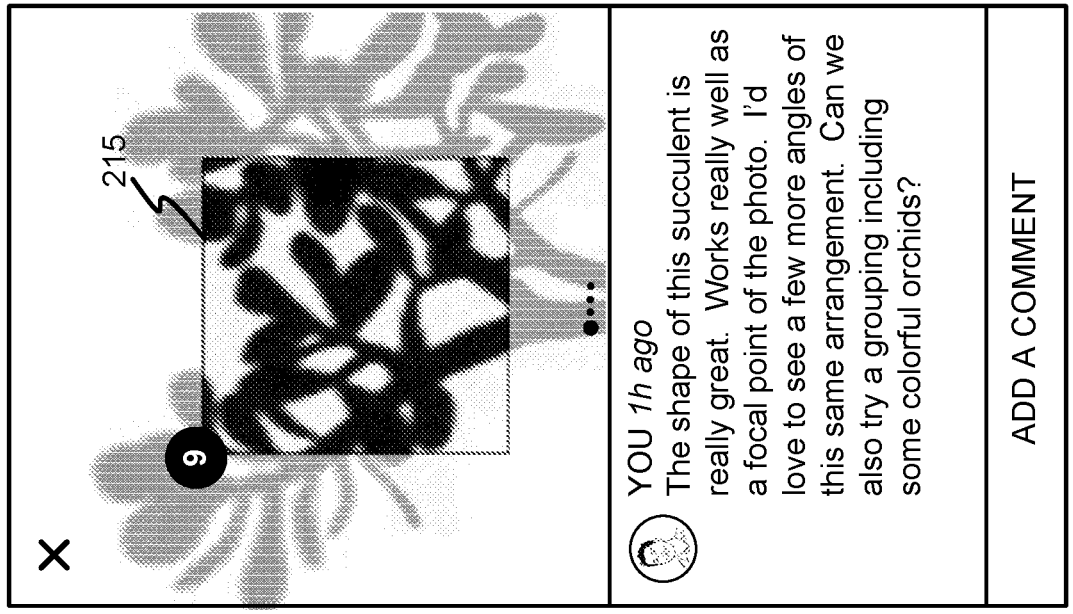
Figure 2C:
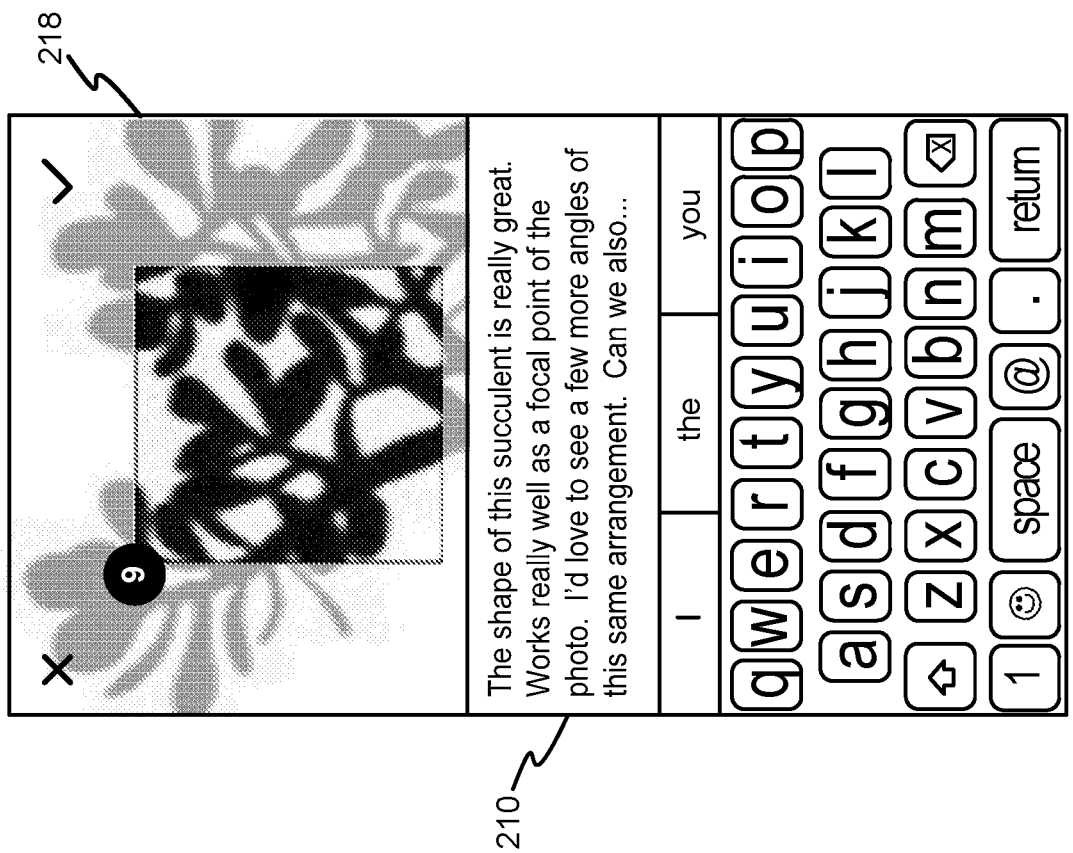

FIG. 2C illustrates text entered by the user into the text entry box 210. When the user confirms creation of the annotation (by, for example, selecting the check mark 218), the client device 110 creates an annotation using the text entered by the user and associates the annotation with the portion of the document identified by the selection box 215. The annotation created by the client device 110 is shown in FIG. 2D. The client device 110 sends the text to the content server 120, which stores the text and a location of the selection box 215 within the image 200 as an annotation of the image 200.

Figure 3B:
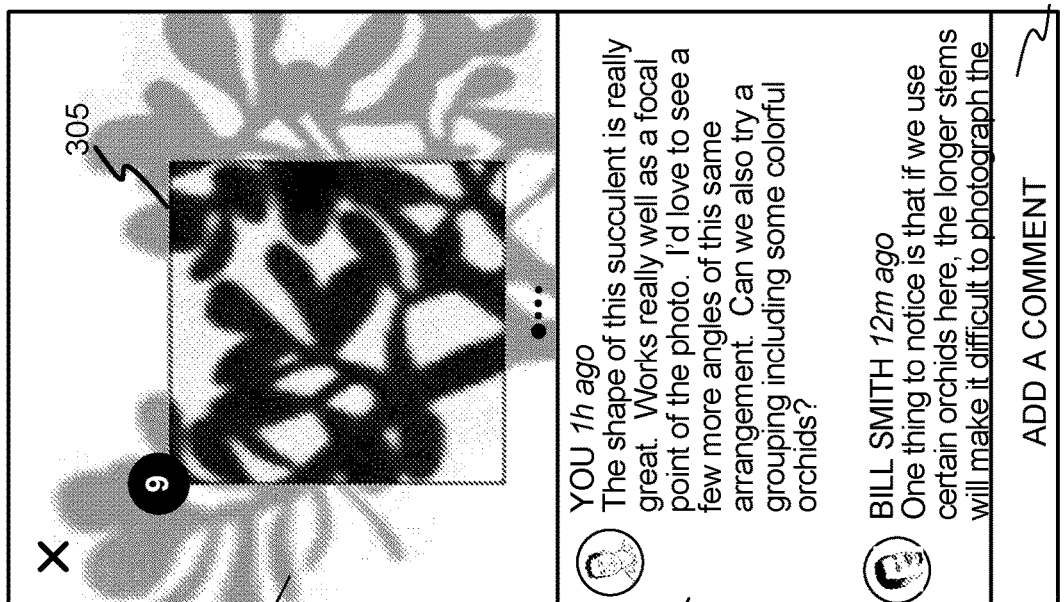
FIGS. 3A-3D illustrate a process performed at the client device for replying to an annotation associated with electronic content, according to one embodiment.
Figure 3A:
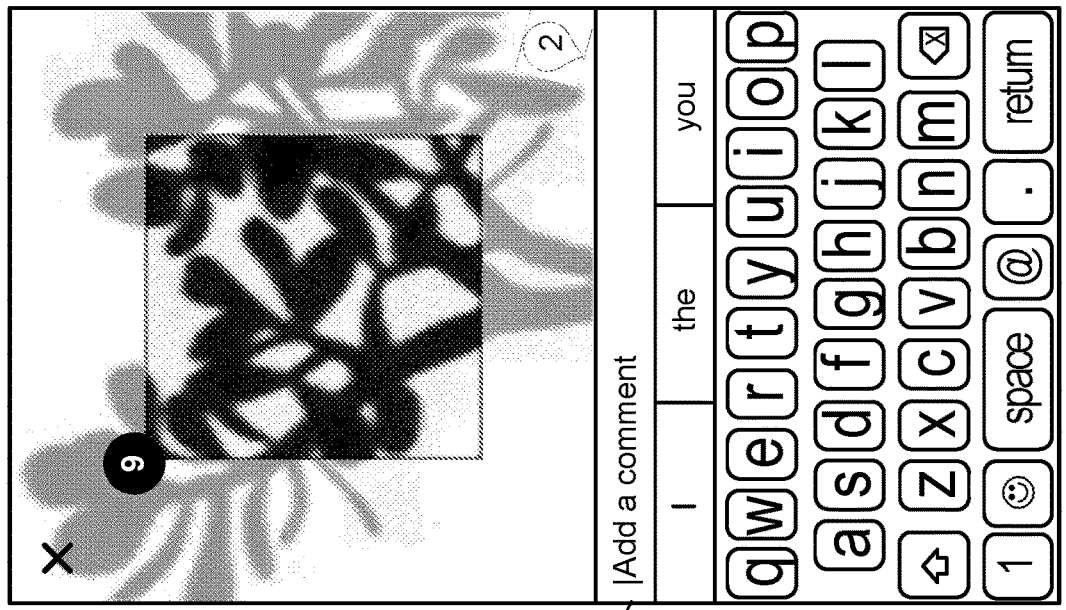
Figure 3D:
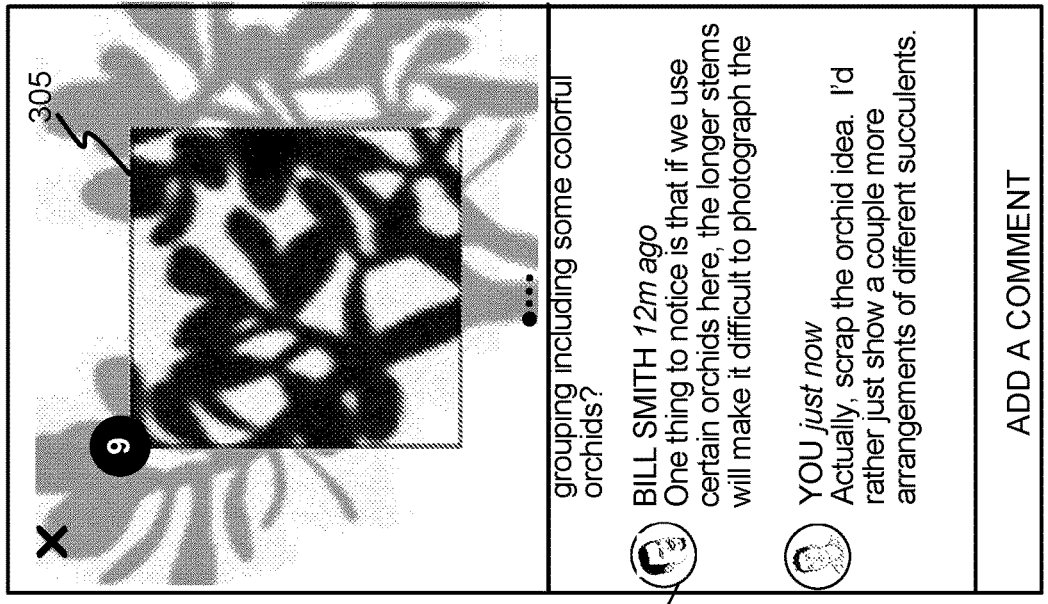
Figure 3C:
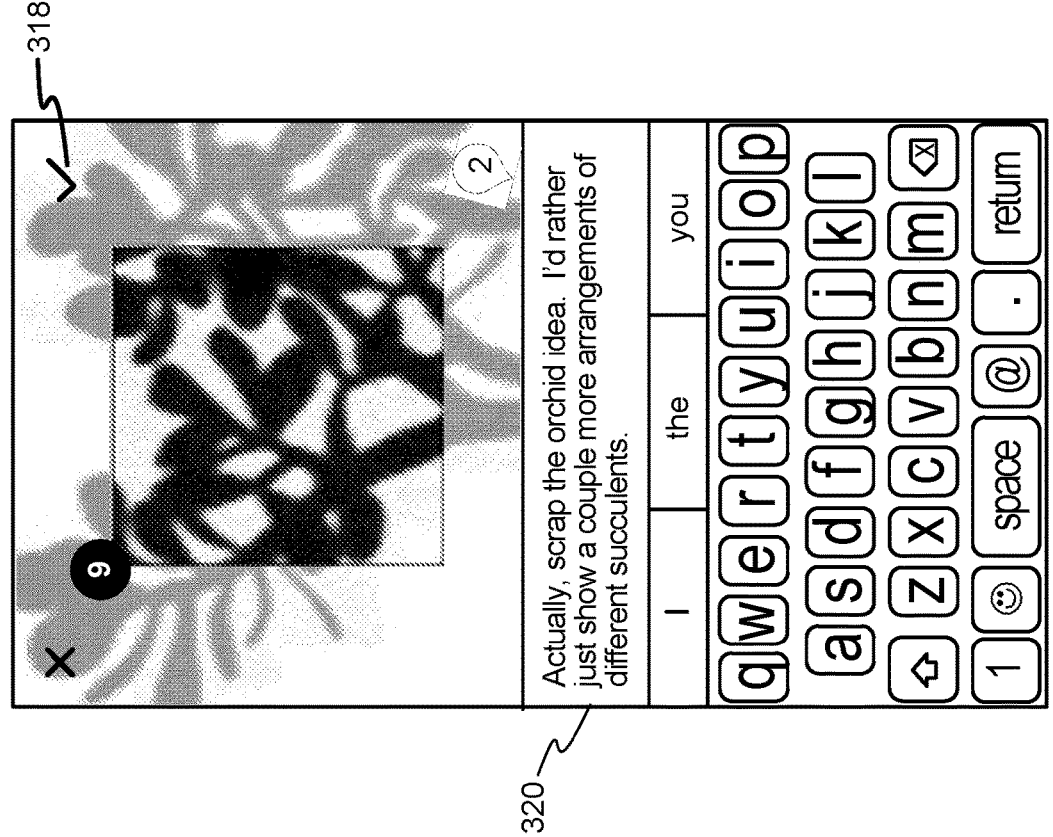

FIGS. 3A-3D illustrate a process performed at the client device 110 for adding a comment to an existing annotation associated with electronic content, according to one embodiment. FIG. 3A illustrates an annotation 305 associated with the image 200. The annotation 305 includes a comment chain 310, comprising one or more comments provided by users of the client devices 110. A user input 315 to add a comment to the comment chain associated with the annotation 305 is received. For example, the client device 110 receives a touch input at an "add a comment" button. In response to the input 315, the client device 110 displays a text entry box 320, as shown in FIG. 3B, for receiving the comment from the user of the client device 110. FIG. 3C illustrates text entered by the user into the text entry box 320. When the user confirms the comment (by, for example, selecting the check mark 318), the client device 110 associates the comment with the annotation 305. FIG. 3D illustrates the comment added to the comment chain 310 associated with the annotation 305. Thus, a user of the client device 110 can reply directly to a comment associated with the image 200.

Figure 4:
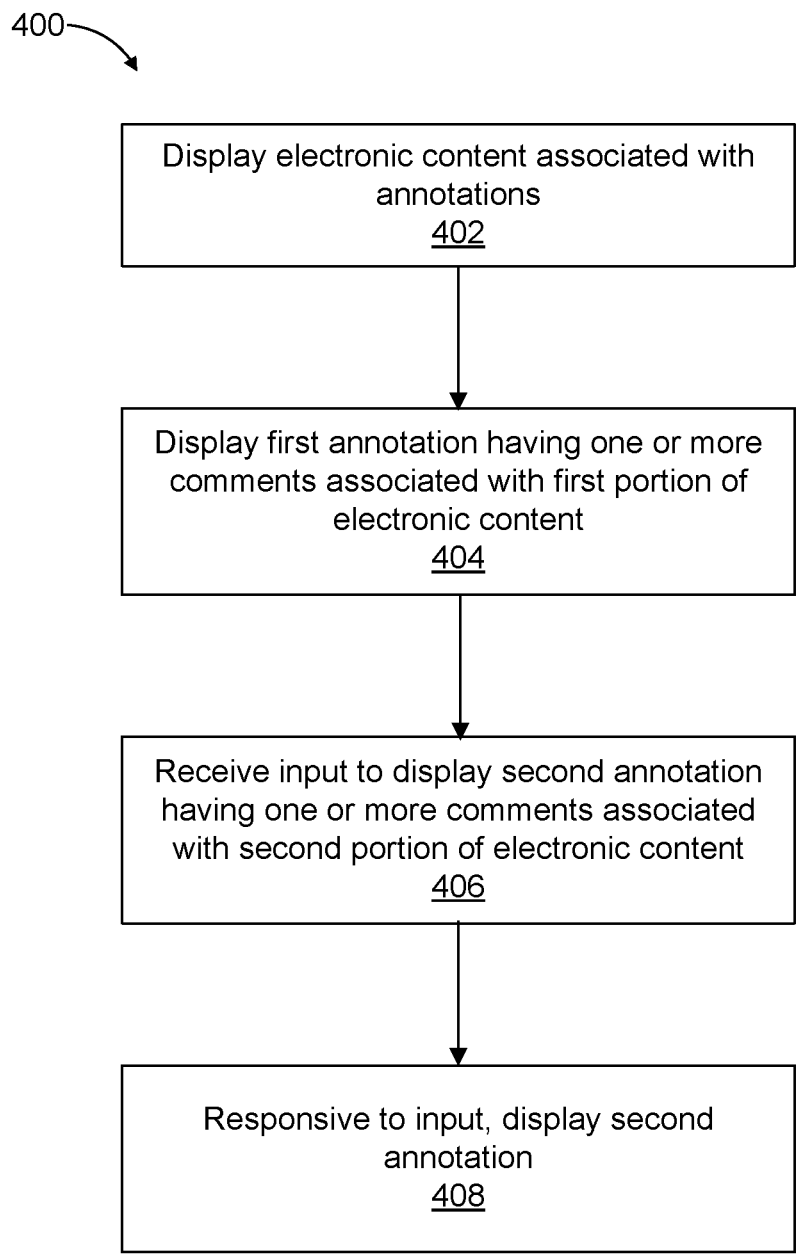
FIG. 4 is a flowchart illustrating a process for displaying annotations associated with electronic content, according to one embodiment.

FIG. 4 is a flowchart illustrating a process 400 for displaying annotations associated with electronic content, according to one embodiment. In one embodiment, the process 400 shown in FIG. 4 is performed by a client device 110. The process 400 may include different, additional, or fewer steps, and the steps may be performed in different orders. FIG. 4 is described with respect to the user interfaces shown in FIGS. 5A-5D.

Figure 5B:
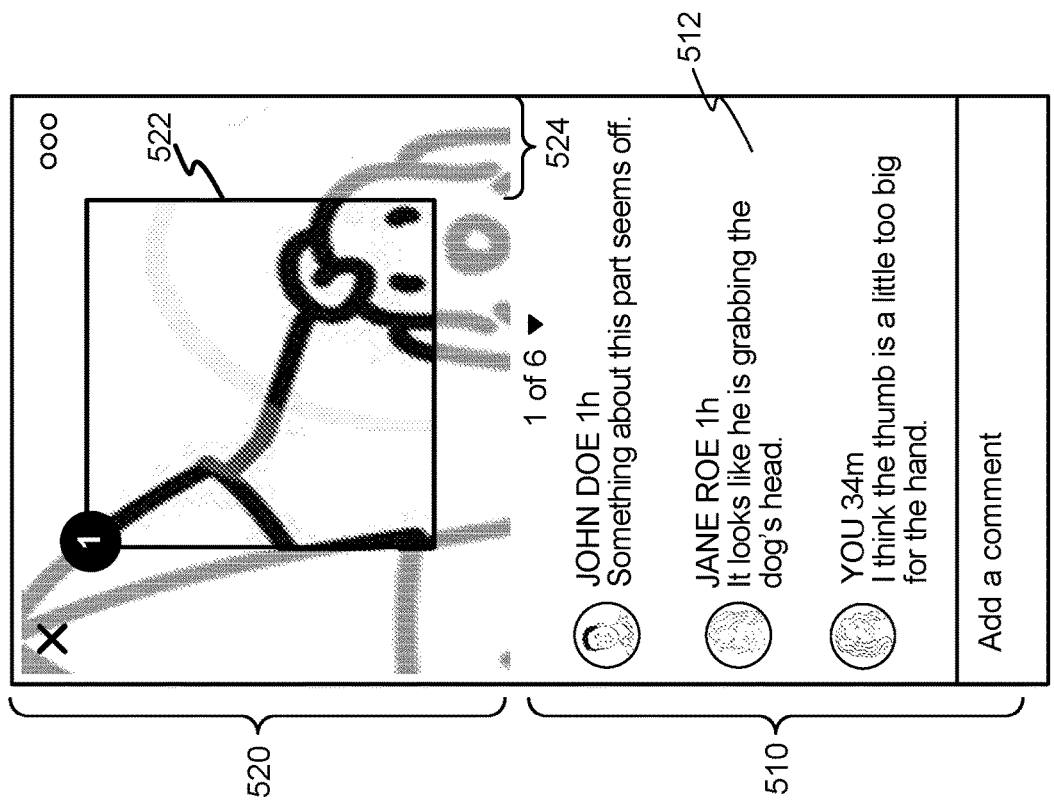
FIGS. 5A-5D illustrate a process performed at the client device for displaying annotations associated with electronic content, according to one embodiment.
Figure 5A:
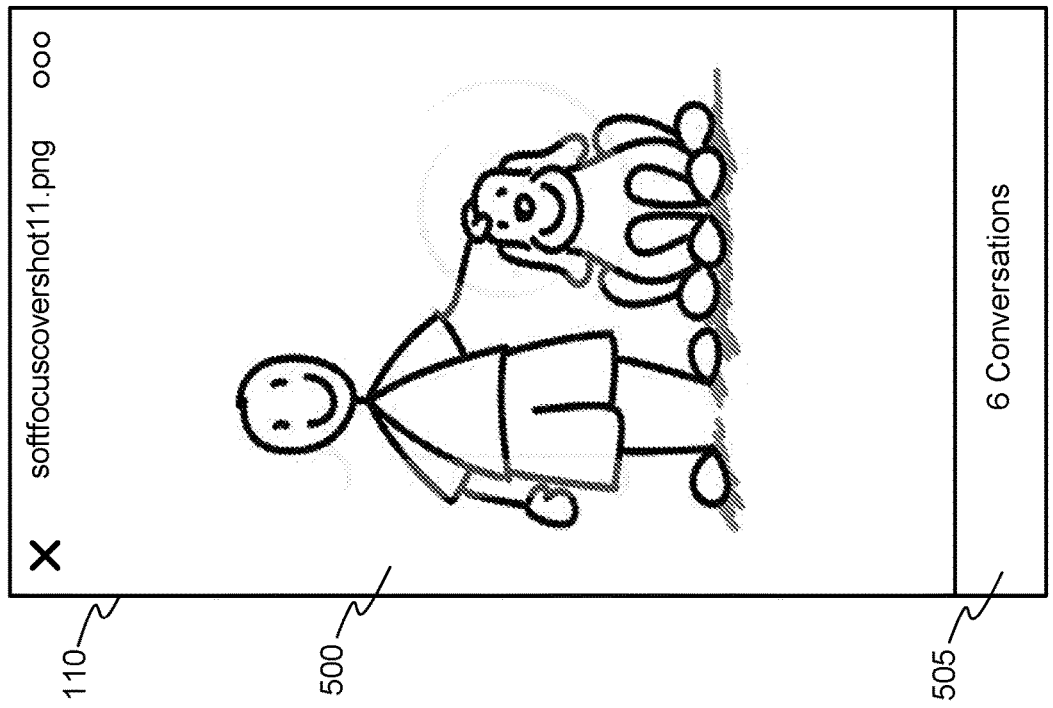

Referring to FIG. 4, the client device 110 displays 402 electronic content associated with a plurality of annotations. Each annotation corresponds to a respective portion of the electronic content. Depending on the format of the electronic content, the annotation may correspond to a spatial region within the content, a spatial region within the content at a particular time, or a spatial region on a particular page of the content. FIG. 5A illustrates an image 500, as example electronic content, displayed by the client device 110. In one embodiment, the client device 110 also displays an annotation bar 505 indicating a number of annotations associated with the image 500. The client device 110 may indicate the annotations associated with the image 500 in a variety of other manners, such as displaying numbered or lettered identifiers of the annotations within the image 500. The annotation bar 505 may also be displayed at a different location on the display than shown in FIG. 5A.

The client device 110 displays 404 a first annotation, which includes one or more comments associated with a first portion of the electronic content. To display an annotation associated with the image 500, a user may provide an input at the annotation bar 505 shown in FIG. 5A. For example, the user taps at the annotation bar 505 or swipes the annotation bar 505 upwards on the display of the client device 110. As shown in FIG. 5B, the client device 110 in one embodiment displays one or more comments 512 corresponding to a first annotation in a first region 510 of the display, and displays a portion of the image 500 with which the first annotation is associated in a second region 520 of the display. The first region 510 of the display may be scrollable to display additional comments 512 associated with the first annotation.

In one embodiment, the client device 110 displays the electronic content at a zoom level such that the first portion is displayed with a border defining a distance between at least one side of the first portion and an edge of the display of the client device 110. The border may be a fixed size (e.g., 100 pixels), a fixed portion of the display area displaying the first portion (e.g., 10%), or dynamically determined based on the size and shape of the first portion. For example, as shown in FIG. 5B, the image 500 displayed in the second region 520 of the display such that the spatial region 522 associated with the first annotation is displayed, as well as a border 524 specifying a distance between a side of the spatial region 522 and an edge of the display. In another embodiment, the client device 110 displays the electronic content at a specified zoom level within the second region 520 of the display, regardless of the size of the first portion of the electronic content associated with the first annotation.

Figure 5D:
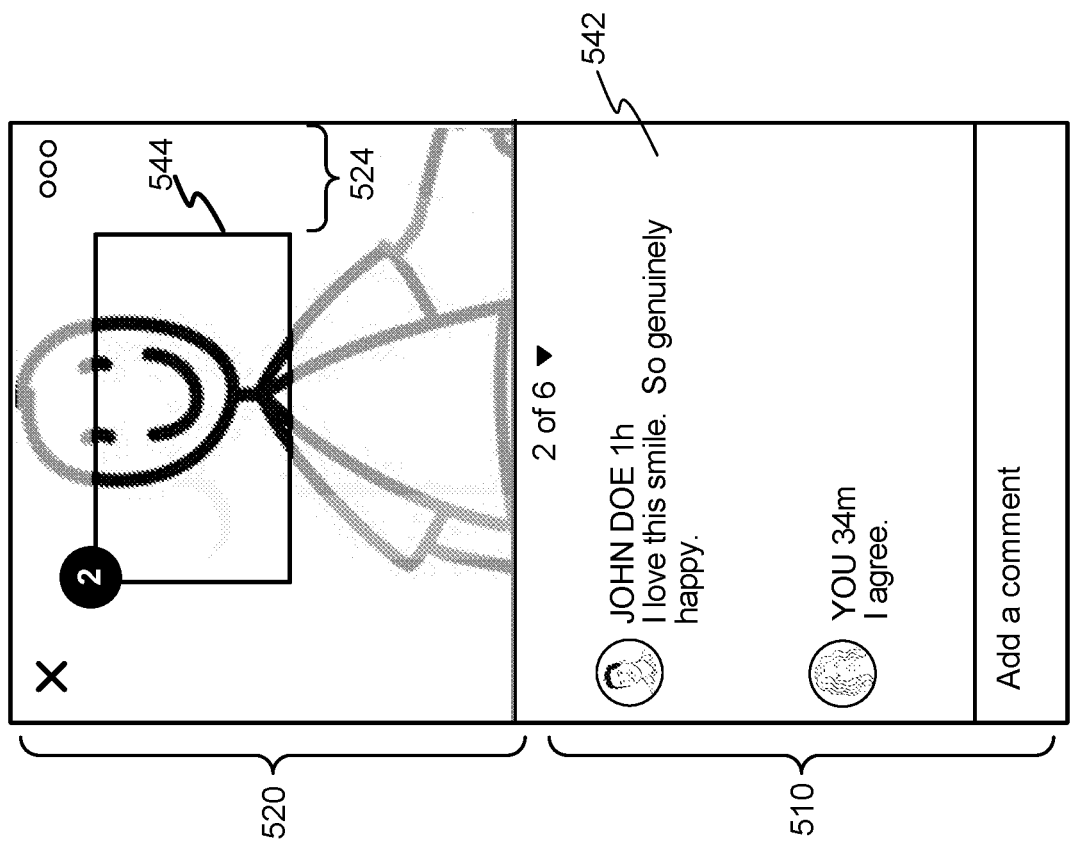
Figure 5C:
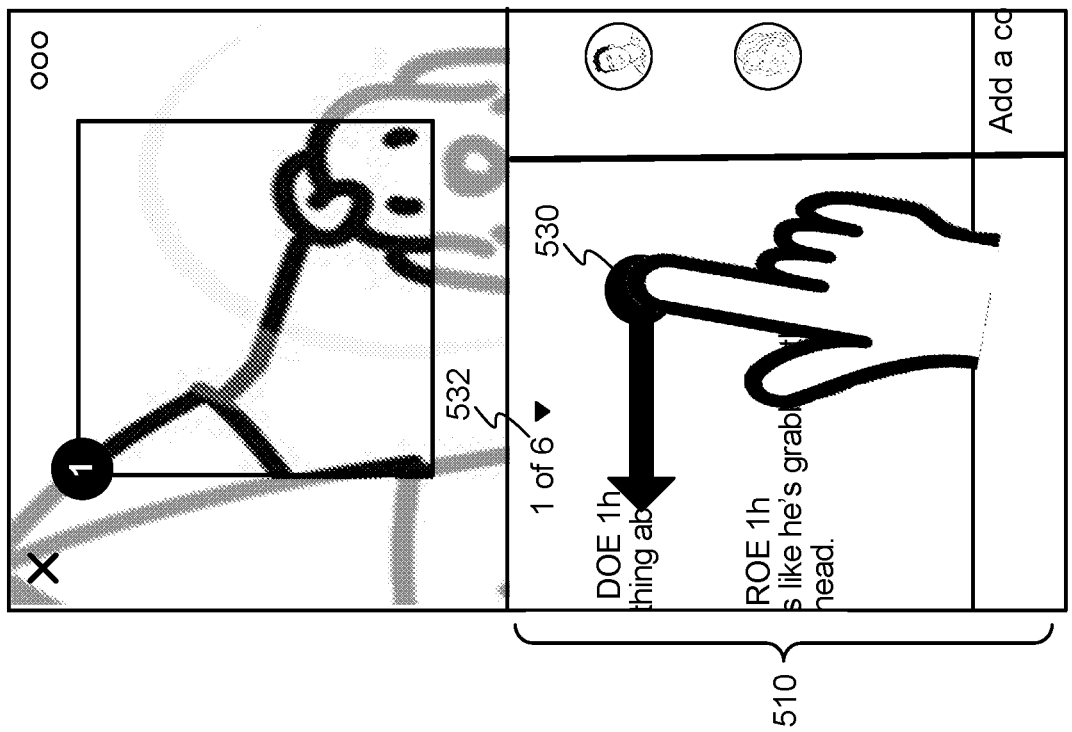

The client device 110 receives 406 an input to display a second annotation associated with the electronic content. Like the first annotation, the second annotation includes one or more comments and is associated with a second portion of the electronic content. FIG. 5C illustrates an example user input 530 received 406 by the client device 110 to navigate to a second annotation associated with the image 500. In the example of FIG. 5C, the user input 530 is a swipe gesture received in the first region 510 of the display. In other embodiments, a user may navigate to a second annotation by repositioning the image within the second region 520 of the display to the location associated with the second annotation, selecting the second annotation from a menu 532, selecting an arrow key of the client device 110 or an arrow button displayed by the client device 110, or providing any of a variety of other types of input.

In response to the user input 530, the client device 110 displays 408 the second portion of the electronic content and the one or more comments associated with the second annotation. FIG. 5D illustrates example comments 542 associated with a second annotation that are displayed in the first region 510 of the display, and a portion of the image 500 with which the second annotation is associated displayed in the second region 520 of the display. The portion of the image displayed in the second region 520 of the display includes the second portion 544 with which the second annotation is associated. In one embodiment, the client device 110 automatically pans and/or zooms the electronic content to display the second portion of the content associated with the second annotation, without a manual input from the user to pan or zoom the image. When transitioning to the second annotation, the client device 110 may pan or zoom the electronic content until the second portion of the content is displayed at a predetermined position within the first region 510 of the display. For example, as shown in FIG. 5D, the second portion 544 is displayed with the border 524 defining a distance between a right side of the second portion 544 and a right edge of the display. The client device 110 may additionally or alternatively display the second portion 544 with borders on other sides, or may display the electronic content at a predetermined zoom level regardless of the size of the second portion 544.

FIGS. 6A-6E illustrate an example of the process 400 when the electronic content is a multipage document and annotations are associated with different pages of the document.

Figure 6B:
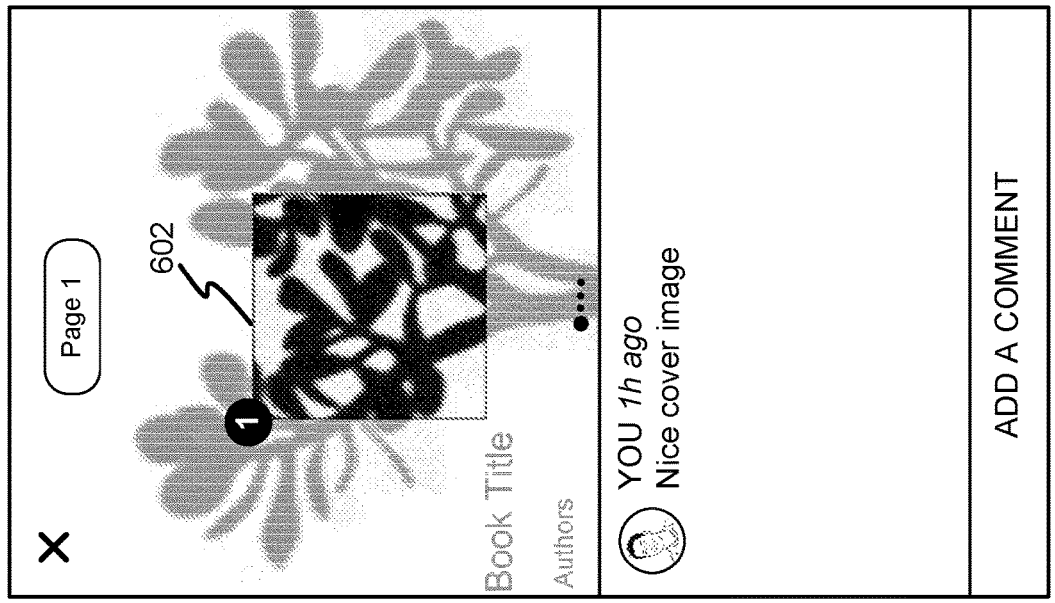
FIGS. 6A-6F illustrate a process performed at the client device for displaying annotations associated with a multi-page document, according to one embodiment.
Figure 6A:
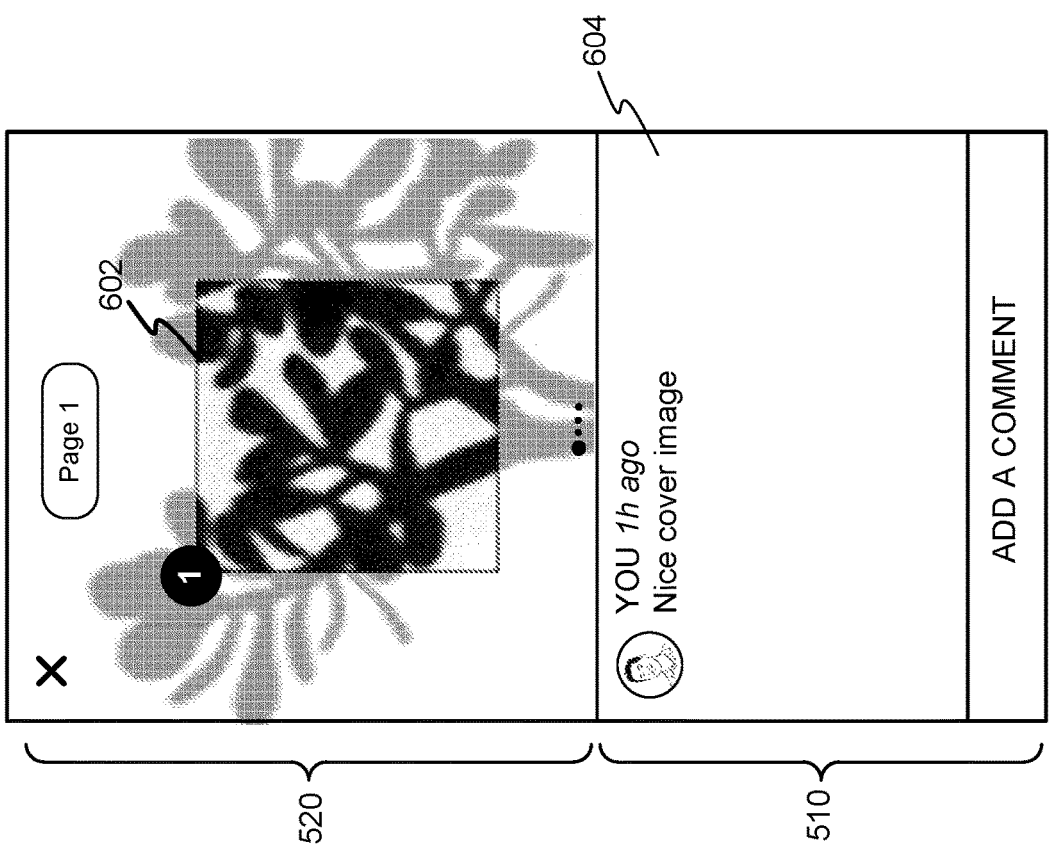

As shown in FIG. 6A, the client device 110 displays a first annotation associated with a first portion 602 of the document. In the example of FIG. 6A, the first portion 602 is a portion of page 1 of the document. The first annotation includes at least one comment 604, which in one embodiment is displayed in the first region 510 of the display while the portion 602 of the document is displayed in the second region 520.

When transitioning from the first annotation to a second annotation on a different page (e.g., in response to a user swipe gesture received at the first region 510 of the display), the client device 110 shows an animation including content of the document between the portion associated with the first annotation and the portion associated with the second annotation. In one embodiment, as shown for example in FIGS. 6B-6E, the animation zooms out from the first portion of the document until one or more pages are displayed, scrolls past representations of pages of the document between the first and second annotations, and zooms into the portion of the document associated with the second annotation.

Figure 6D:
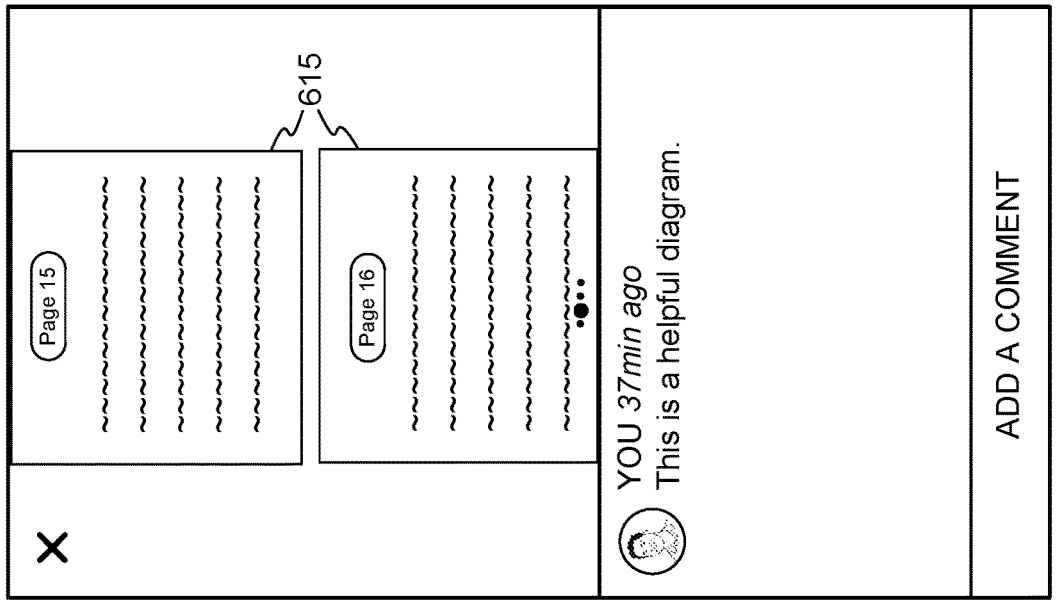
Figure 6C:
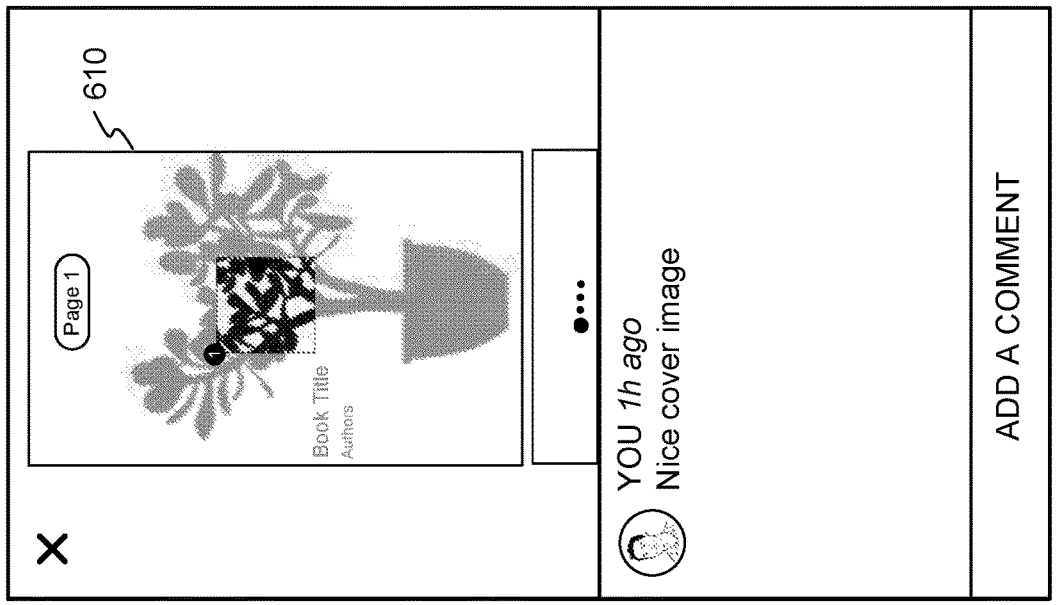

FIG. 6B illustrates an example of the client device 110 zooming out from the portion 602 of the document associated with the first annotation, and FIG. 6C illustrates the display zoomed out to show a representation 610 of the entire first page of the document. Although FIG. 6C shows an example in which the client device 110 zooms out the displayed portion of the document until one document page is shown in its entirety, the zoom level of document pages during the transition to the second annotation may be greater or lesser than shown in FIG. 6C. For example, the client device 110 may zoom out until multiple pages are displayed.

FIG. 6D illustrates the client device 110 scrolling past representations 615 of pages of the document between the first page and page 18, where the second annotation is located. In one embodiment, the client device 110 displays the intervening pages if the pages are cached at the client device 110 or retrieved quickly enough from the content server 120 to display during the annotation. If the pages are not locally cached and the network connection between the client device 110 and the server 120 is slower, the client device 110 may instead display blank page outlines of the intervening pages or other representations of the pages.

Figure 6E:
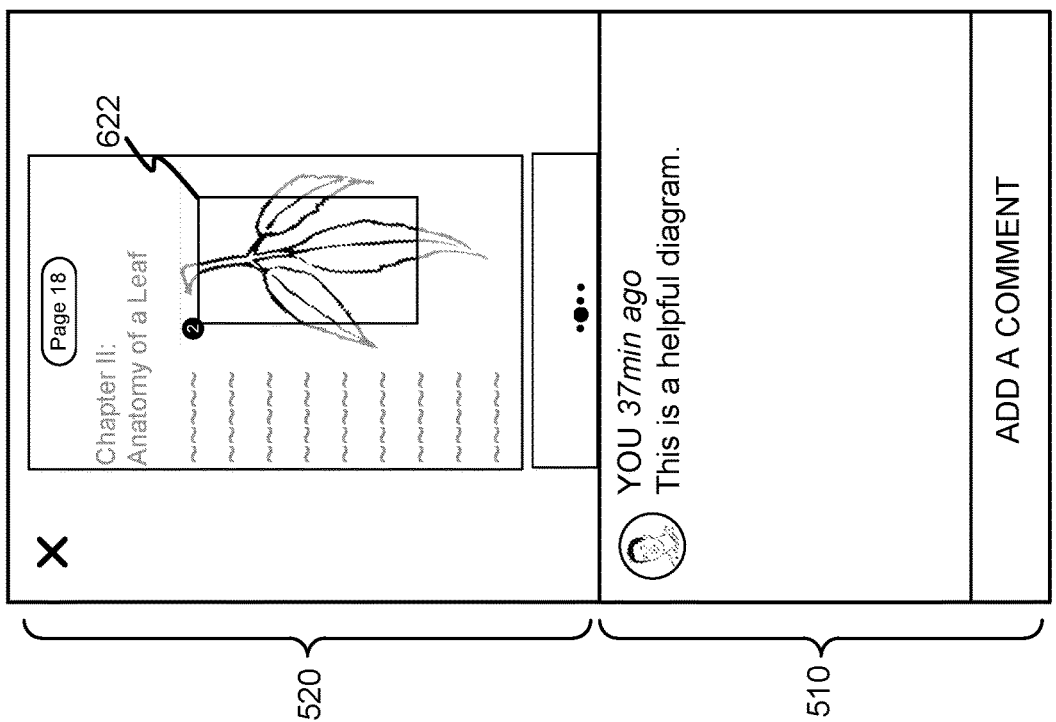
Figure 6F:
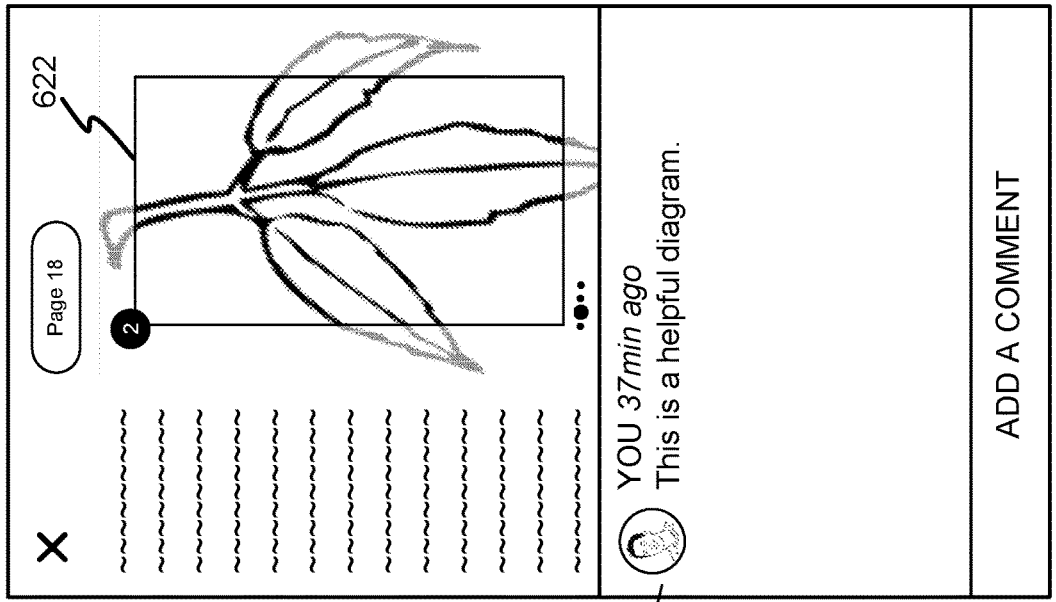

FIG. 6E illustrates the client device 110 beginning to zoom in on a second portion 622 of the document with which the second annotation is associated, and FIG. 6F illustrates the display zoomed in on the second portion 622. In one embodiment, the client device 110 zooms in on the portion 622 until it is displayed at a specified zoom level. In another embodiment, the client device 110 zooms in until the portion 622 is displayed with a border defining a distance between at least one side of the portion 622 and an edge of the display. While the portion 622 of the document is displayed (e.g., in the second region 520 of the display), the client device 110 also displays the one or more comments 624 associated with the second annotation.

The processes described with respect to FIG. 4 and illustrated in FIGS. 5A-6E enable a user to easily view and create annotations associated with electronic content. Because a communication channel is integrated into a content viewer, the user of the client device 110 does not need to switch between applications to view the content and add comments to the content. This integration of a communication channel into a content viewer is particularly advantageous when the client device 110 is a mobile device with a relatively small display area (e.g., a mobile phone), since switching between applications on a mobile device significantly increases the cognitive burden to the user and the amount of time the user would need to spend to annotate the content. Moreover, by linking an annotation to a specified portion of the content and showing the specified portion while displaying the annotation, the client device 110 enables a user to create annotations that specifically identify the portion of the content of interest to the user. These annotations enable the user to more clearly communicate comments on the electronic content with other users, improving user workflow when collaborating on documents.

CONCLUSION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method comprising:
    interacting with a content server to display electronic content at a computing device, the electronic content associated with a plurality of annotations, each annotation specifying a respective portion of the electronic content;
    while displaying the electronic content, receiving an annotation input for a first annotation based on user interaction with a user interface of the computing device, the annotation input including a single user input selection indicating a plurality of boundary points defining a first region of an image;
    in response to receiving the single user input selection, displaying a text entry box substantially simultaneously with displaying the first region of the image, the text entry box configured to receive a first comment;
    receiving the first comment via the text entry box;
    sending the first annotation to the content server;
    displaying the first annotation at the computing device, the first annotation including the first comment associated with the first region of the image, wherein displaying the first annotation comprises simultaneously displaying the first region of the image and the first comment with the first region of the image visually designated by a border;
    while displaying the first annotation, receiving a second input to display a second annotation associated with a second portion of the electronic content, the second annotation including one or more comments associated with the second portion, the second portion representing a second spatial segment of the electronic content; and
    responsive to receiving the second input, displaying the second portion of the electronic content and the one or more comments associated with the second portion at the computing device.

2. The method of claim 1, wherein displaying the first annotation comprises:
    generating a display including a first region of the display and a second region of the display;
    displaying the first comment in the first region of the display; and
    displaying the first region of the image in the second region of the display.

3. The method of claim 2, wherein the second input to display the second annotation comprises a swipe gesture received at the first region of the display.

4. The method of claim 2, wherein the first region of the display is scrollable to display additional comments of the first annotation.

5. The method of claim 1, wherein displaying the first annotation comprises:
    displaying the electronic content at a zoom level such that the first region of the image is displayed with the border defining a distance between at least one side of the first region of the image and an edge of a display screen of the computing device.

6. The method of claim 5, further comprising:
    responsive to receiving the second input to display the second annotation, panning and zooming the electronic content until a second region of the image is displayed with a second border defining a distance between at least one side of the second region of the image and the edge of the display screen.

7. The method of claim 1, wherein displaying the first annotation comprises displaying a box overlaid on the electronic content and identifying the first region of the image.

8. The method of claim 1, further comprising:
    receiving a third input to create a new annotation associated with the electronic content;
    displaying an adjustable selection box around a third portion of the electronic content;
    receiving a third comment entered by a user; and
    associating the third comment with the third portion of the electronic content.

9. The method of claim 1, further comprising, while displaying the first annotation:
    receiving a fourth comment from a user of the computing device; and
    adding the received fourth comment to a comment chain.

10. The method of claim 1, wherein the single user input selection corresponds to a selection box, wherein the selection box is one of:
    a freeform shape or a non-freeform shape.

11. The method of claim 1, further comprising:
    navigating to the second annotation by one of:
        repositioning the electronic content to a location associated with the second annotation,
        selecting the second annotation from a menu, and
        selecting an arrow key of the computing device or an arrow button on an electronic display of the computing device.

12. The method of claim 1, further comprising:
    pushing from the content server to the computing device a new annotation to the electronic content,
    wherein the first annotation and the new annotation are initially input by different users.

13. The method of claim 1, wherein the second portion of the electronic content is a second region of the image.

14. A non-transitory computer-readable storage medium storing executable computer program instructions that are executable by a processor to:
    interact with a content server to display electronic content, the electronic content associated with a plurality of annotations each specifying a respective portion of the electronic content;
    while displaying the electronic content, receive an annotation input for a first annotation based on user interaction with a user interface of a computing device, the annotation input including a single user input selection indicating a plurality of boundary points defining a first region of an image;
    in response to receiving the single user input selection, display a text entry box substantially simultaneously with displaying the first region of the image, the text entry box configured to receive a first comment;
    receive the first comment via the text entry box;
    send the first annotation to the content server;
    display the first annotation, the first annotation including the first comment associated with the first region of the image, wherein displaying the first annotation comprises simultaneously displaying the first region of the image and the first comment with the first region of the image visually designated by a border;
    while displaying the first annotation, receive a second input to display a second annotation associated with a second portion of the electronic content, the second annotation including one or more comments associated with the second portion, the second portion representing a spatial segment of the electronic content; and responsive to receiving the second input, display the second portion of the electronic content and the one or more comments associated with the second portion.

15. The non-transitory computer-readable storage medium of claim 14, wherein the instructions for displaying the first annotation comprise instructions that are executable by the processor to:
- generate a display including a first region of the display and a second region of the display;
- display the first comment in the first region of the display; and
- display the first region of the image in the second region of the display.

16. The non-transitory computer-readable storage medium of claim 15, wherein the second input to display the second annotation comprises a swipe gesture received at the first region of the display.

17. The non-transitory computer-readable storage medium of claim 15, wherein the first region of the display is scrollable to display additional comments of the first annotation.

18. The non-transitory computer-readable storage medium of claim 14, wherein the instructions for displaying the first annotation comprise instructions that are executable by the processor to:
- display the electronic content at a zoom level such that the first region of the image is displayed with the border defining a distance between at least one side of the first region of the image and an edge of a display screen.

19. The non-transitory computer-readable storage medium of claim 18, further comprising instructions that are executable by the processor to:
- responsive to receiving the second input to display the second annotation, pan and zoom the electronic content until the second portion is displayed with a second border defining a distance between at least one side of the second portion and the edge of the display screen.

20. The non-transitory computer-readable storage medium of claim 14, wherein the instructions for displaying the first annotation comprise instructions that are executable by the processor to display a box overlaid on the electronic content and identifying the first region of the image.

21. The non-transitory computer-readable storage medium of claim 14, further comprising instructions that are executable by the processor to:
- receive a third input to create a new annotation associated with the electronic content;
- display an adjustable selection box around a third portion of the electronic content;
- receive a third comment entered by a user; and
- associate the third comment with the third portion of the electronic content.

22. The non-transitory computer-readable storage medium of claim 14, further comprising instructions that are executable by the processor to, while displaying the first annotation:
- receive a fourth comment from a user; and
- add the received fourth comment to a comment chain.

23. The non-transitory computer-readable storage medium of claim 14, wherein:
- the first annotation is displayed at a first computing device;
- the second input to display the second annotation is received from a second computing device; and
- the second portion of the electronic content is displayed at the second computing device.

* * * * *